United States Patent
Blackford et al.

(10) Patent No.: US 8,000,345 B2
(45) Date of Patent: Aug. 16, 2011

(54) PROXY AGENT FOR PROVIDING REMOTE MANAGEMENT OF EQUIPMENT IN A COMMUNICATION NETWORK

(75) Inventors: John Blackford, Dallas, TX (US); Brian Peck, Flower Mound, TX (US); Duane Murphy, Vacaville, CA (US)

(73) Assignee: Siemens Aktiengesellschaft

( * ) Notice: Subject to any disclaimer, the term of this patent is extended or adjusted under 35 U.S.C. 154(b) by 1172 days.

(21) Appl. No.: 11/361,401

(22) Filed: Feb. 24, 2006

(65) Prior Publication Data

US 2007/0201508 A1     Aug. 30, 2007

(51) Int. Cl.
H04J 3/22      (2006.01)

(52) U.S. Cl. ..................................... 370/466; 370/395.5

(58) Field of Classification Search .................. 370/464, 370/465, 466, 389, 467, 475, 392, 470, 395.5; 379/90.01, 93.01, 93.26, 93.28, 93.31; 710/1, 710/8, 11; 709/230, 237, 224, 225, 249
See application file for complete search history.

(56) References Cited

U.S. PATENT DOCUMENTS

| | | | | |
|---|---|---|---|---|
| 5,208,811 | A * | 5/1993 | Kashio et al. | 370/401 |
| 6,426,947 | B1 * | 7/2002 | Banker et al. | 370/254 |
| 6,751,191 | B1 * | 6/2004 | Kanekar et al. | 370/217 |
| 7,042,876 | B1 * | 5/2006 | Jayasenan et al. | 370/389 |
| 7,139,811 | B2 * | 11/2006 | Lev Ran et al. | 709/217 |
| 7,227,872 | B1 * | 6/2007 | Biswas et al. | 370/465 |
| 7,359,389 | B2 * | 4/2008 | Kusayanagi | 370/401 |
| 2003/0005105 | A1 | 1/2003 | Robb | |
| 2003/0145082 | A1 * | 7/2003 | Son | 709/224 |
| 2003/0149892 | A1 | 8/2003 | Robinson | |
| 2004/0122972 | A1 | 6/2004 | Gibson et al. | |
| 2005/0071423 | A1 * | 3/2005 | Rajaniemi | 709/203 |
| 2005/0080886 | A1 | 4/2005 | Croy et al. | |
| 2006/0026301 | A1 | 2/2006 | Maeda et al. | |
| 2007/0180485 | A1 * | 8/2007 | Dua | 725/114 |
| 2007/0220093 | A1 * | 9/2007 | Bracke et al. | 709/204 |

OTHER PUBLICATIONS

Jeff Bernstein, Tim Spets and Christele Bouchat (editors), DSLHome™ Data Model Template for TR-069-Enabled Devices, Technical Report, Sep. 2005, pp. 1-29, produced by DSLHome-Technical Working Group, Working Group Chair-Greg Bathrick.
Jeff Bernstein and Tim Spets (editors), CPE WAN Management Protocol, Technical Report, May 2004, pp. 1-28 of 109 (without appendices), produced by DSLHome-Technical Working Group, Working Group Co-Chairs-Greg Bathrick and George Pitsoulakis.

* cited by examiner

*Primary Examiner* — Andrew Lai (74) *Attorney, Agent, or Firm* — Bachman & LaPointe, P.C.

(57) ABSTRACT

In one aspect a method for remotely managing a non-compliant Internet Gateway Device (IGD) residing in a Local Area Network (LAN) is provided. The method includes providing a proxy agent that resides on a computer in the LAN. The proxy agent receives from a Wide Area Network (WAN) configuration device a Customer Premises Equipment (CPE) WAN Management Protocol (CWMP) request message, converts the request message to a protocol that is used by the IGD and communicates the converted request message upstream toward the IGD. The proxy agent receives a response from the IGD, converts the response from a first protocol to the CWMP, and sends the converted response upstream toward the WAN configuration device.

14 Claims, 8 Drawing Sheets

PROXY AGENT FOR PROVIDING REMOTE MANAGEMENT OF EQUIPMENT IN A COMMUNICATION NETWORK

FIELD OF INVENTION

This invention relates to managing equipment in a communication network, and more particularly, to a proxy agent in a Local Area Network (LAN) to allow remote management of LAN equipment.

BACKGROUND OF INVENTION

Remote management of equipment in a communications network is quite desirable. It allows for a centralized management of the equipment without having to deploy people and devices to the location of the equipment. Furthermore, it may provide a common interface to manage the equipment versus each type of equipment having a vendor specific interface. Thus remote management can save the network operator time and money.

One way that remote management can be achieved is with a Terminal emulation program (Telnet). Telnet provides access to the equipment and allows commands to manage the equipment to be entered via a command line interface (CLI). However, there are drawbacks to Telnet. One drawback is that Telnet is typically disabled on the Wide Area Network (WAN) side, which results in the lack of accessibility from the WAN for remote management. There are several problems even if Telnet is enabled on the WAN side. One such problem is that Telnet does not have a robust security mechanism which makes is susceptible to security breaches. Another problem is that the Internet Protocol (IP) address for equipment in a LAN network is usually dynamically assigned via Dynamic Host Configuration Protocol (DHCP). Thus, the IP address of the equipment may change in contrast to having a static IP address that does not change. When the IP address is dynamically assigned, the WAN side may not have knowledge of the IP address to be able to access the equipment. Yet another drawback of Telnet is that commands are vendor specific thus a common interface is not achieved.

Another way to achieve remote management is by Simple Network Management Protocol (SNMP). SNMP provides remote management by transferring messages, called protocol data units (PDUs), between the equipment and a management system. Although SNMP attempts to address the common interface issue it still has many of the same problem of Telnet, such as typically being disabled on the WAN side and problems of dealing with a dynamic IP address.

Yet another way to achieve remote management is by a protocol to manage Customer Premises Equipment (CPE) from a management device in the WAN, which has been provided by the Digital Subscriber Line (DSL) Forum. This protocol, the CPE WAN Management Protocol (CWMP), is defined in the Technical Report 069 (TR-069). CWMP provides remote management from a configuration device, such as an Auto-Configuration Server (ACS), which communicates with the CPE using the CWMP. In addition to a robust security mechanism, CWMP addresses the problems of dynamic IP addressing. Furthermore, CWMP provides the following primary capabilities in managing the CPE:
auto-configuration and dynamic service provisioning,
software/firmware image management,
status and performance monitoring, and
diagnostics Although CWMP addresses the drawbacks of other schemes, a shortcoming to CWMP is that this does not address the millions of CWMP noncompliant equipment. Therefore, there exists a need to provide an improved remote management to allow management of CWMP noncompliant equipment via CWMP.

SUMMARY OF INVENTION

In one aspect of the present invention a method for remotely managing an Internet Gateway Device (IGD) residing in a LAN is provided. The method comprising providing a proxy agent that resides on a computer in the LAN, receiving from a WAN configuration device a CWMP request message, converting the request message to a first protocol that is used by the IGD, communicating the converted request message upstream toward the IGD, receiving a response from the IGD, converting the response from a first protocol to the CWMP, and sending the converted response upstream toward the WAN configuration device, wherein the IGD is noncompliant in accordance to the CWMP, whereby the IGD is managed from a configuration device.

In another aspect of the invention, a method for remotely managing a CPE residing in a LAN is provided. The method comprising providing a proxy agent in the LAN, receiving from a WAN configuration device a CWMP request message, converting the request message to a first protocol that is used by the CPE, communicating the converted request message toward the CPE, receiving a response from the CPE, converting the response from a first protocol to the CWMP, and sending the converted response toward the WAN configuration device, wherein the CPE is noncompliant in accordance to the CWMP, whereby the CPE is managed from a configuration device.

Yet in another aspect of the invention a method for remotely managing a plurality of equipment via an active proxy agent that resides in a LAN computer is provided. The method comprising providing a first computer having a first proxy agent, wherein the first proxy agent is the active proxy agent, providing a second computer having a second proxy agent, wherein the second proxy agent is a standby proxy agent, receiving from a Wide Area Network (WAN) configuration device a Customer Premises Equipment (CPE) WAN Management Protocol (CWMP) request message, the message received by the active proxy agents, the active proxy agent converting the request message to a first protocol that is used by the equipment, communicating the converted request message toward the equipment, receiving a response from the equipment, converting the response from a first protocol to CWMP, and sending the converted response toward the WAN configuration device, wherein the equipment is noncompliant in accordance to CWMP, whereby the equipment is managed from a WAN configuration device by the active proxy agent.

BRIEF DESCRIPTION OF THE DRAWINGS

The above mentioned and other concepts of the present invention will now be described with reference to the drawings of the exemplary and preferred embodiments of the present invention. The illustrated embodiments are intended to illustrate, but not to limit the invention. The drawings containing the following figures, in which like numbers refer to like parts throughout the description and drawings wherein.

DETAILED DESCRIPTION OF THE INVENTION

The invention described herein may employ one or more of the following concepts. For example, one concept relates to a proxy agent for providing remote management. Another concept relates to a compliant CPE and a non-compliant CPE. Another concept relates to the proxy agent residing in a computer within a LAN. Another concept relates to managing an IGD via the proxy agent. Another concept relates to managing a plurality of different types of non-compliant CPEs via the proxy agent. Still another concept relates to providing a plurality of proxy agents within the LAN. Yet another concept relates to the plurality of proxy agents having an active and standby mode.

The present invention is disclosed in context of an ACS to manage a CPE via the CWMP. The principles of the present invention, however, are not limited to use by an ACS but may be applied to other management devices. Furthermore the present invention is not limited to use by the CWMP but may be applied by other protocols that can be used by a management device to remotely configure a CPE. Moreover, the present invention is disclosed in context of a broadband network connecting to a LAN. However, the principles of the present invention are not limited to a broadband network connecting to a LAN but may further be used with a narrowband network connecting to a LAN. The illustrations and description of the present invention disclosed in context of an ACS to manage a CPE via the CWMP is merely one possible application of the present invention. However, the present invention has particular applicability for use with an ACS to manage a CPE via the CWMP.

In order to use the CWMP solution, the CPE to be managed must be compliant with the CWMP, i.e. a compliant CPE, which requires the equipment to:

have or obtain an Internet Protocol (IP) address,
be capable of communicating using a network layer or layer 3 of the Open Systems Interconnection (OSI) communication model as well as communicating using a transport layer or layer 4 of the OSI model in order to support Transmission Control Protocol (TCP)/IP, and
include a CWMP application that at least supports TCP/IP, Hyper Text Transport Protocol (HTTP), Remote Procedure Call (RPC) methods and Simple Object Access Protocol (SOAP).

However, one skilled in the art would recognize that as the CWMP standard changes these requirements may also change. For example, the standards may change such that Secure Socket Layer (SSL) or that Transport Layer Security (TLS) is required or that SOAP is not required.

Figure 1:
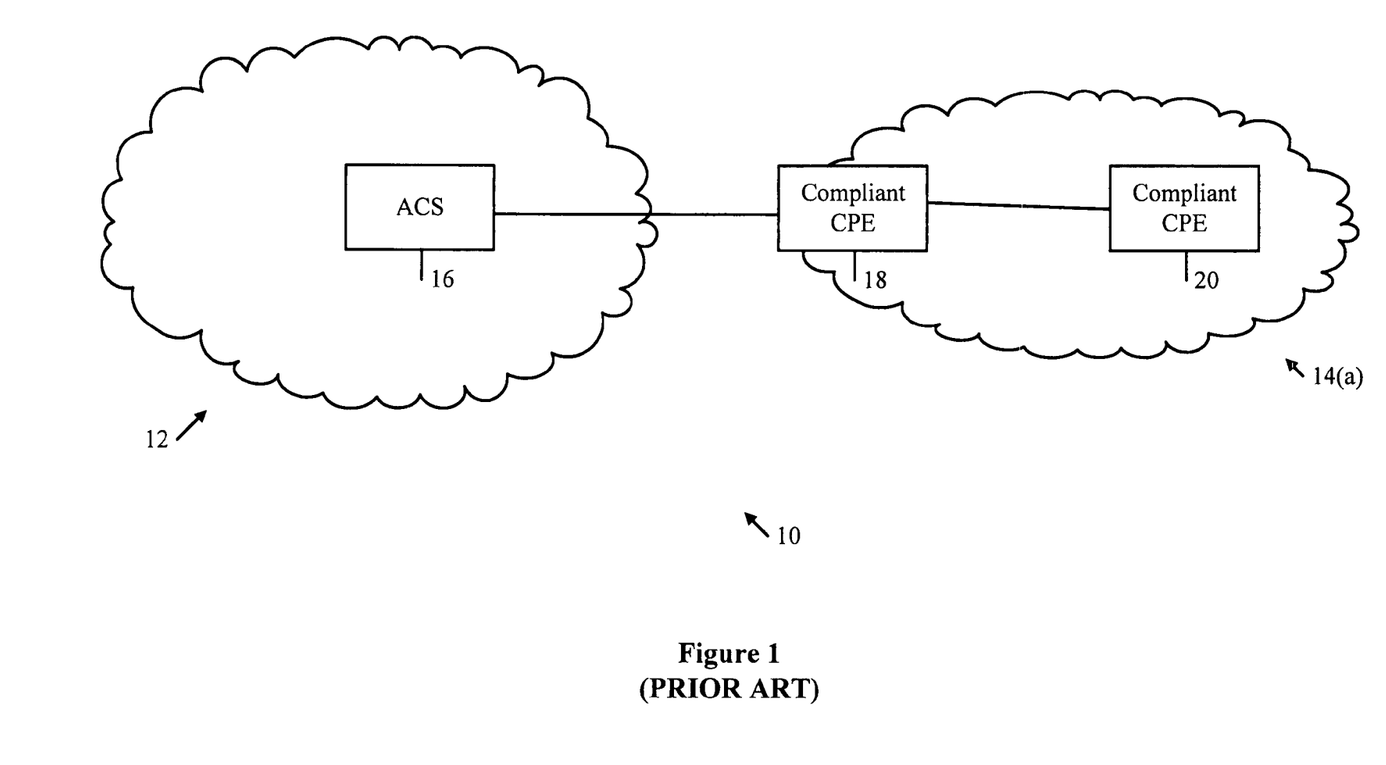
FIG. 1 illustrates an exemplary prior art schematic diagram of a communication network having a management device that manages compliant equipment within the network.

FIG. 1 shows a prior art schematic diagram of a communication network 10 having a WAN 12 comprising an ACS 16 that is capable of communicating with a plurality of compliant CPEs 18, 20 within a plurality of LANs 14, wherein for ease of discussion, only a single LAN 14(a) is shown. LAN 14(a) comprises CPEs 18, 20 that are compliant CPEs. The compliant CPE 18 is a broadband network terminator, such as a gateway or a router, which connects the WAN 12 with the LAN 14. A broadband network terminator is also commonly referred as an Internet Gateway Device (IGD). The compliant CPE 20, such as a video set top box (STB) or Voice over IP (VoIP) Analog Terminal Adapter (ATA), is a device that receives and/or sends data over the WAN 12. For example the video (STB) receives video streams from the WAN 12 and the ATA sends and receives voice communication via the WAN 12. The ACS 16 manages the CPE 18, 20 by sending CWMP requests, such as configuration, provisioning, software image, status, diagnostic and the like, to the CWMP compliant CPE 18, 20. The CPE 18, 20 processes the request and responds back to the ACS 16.

Figure 2:
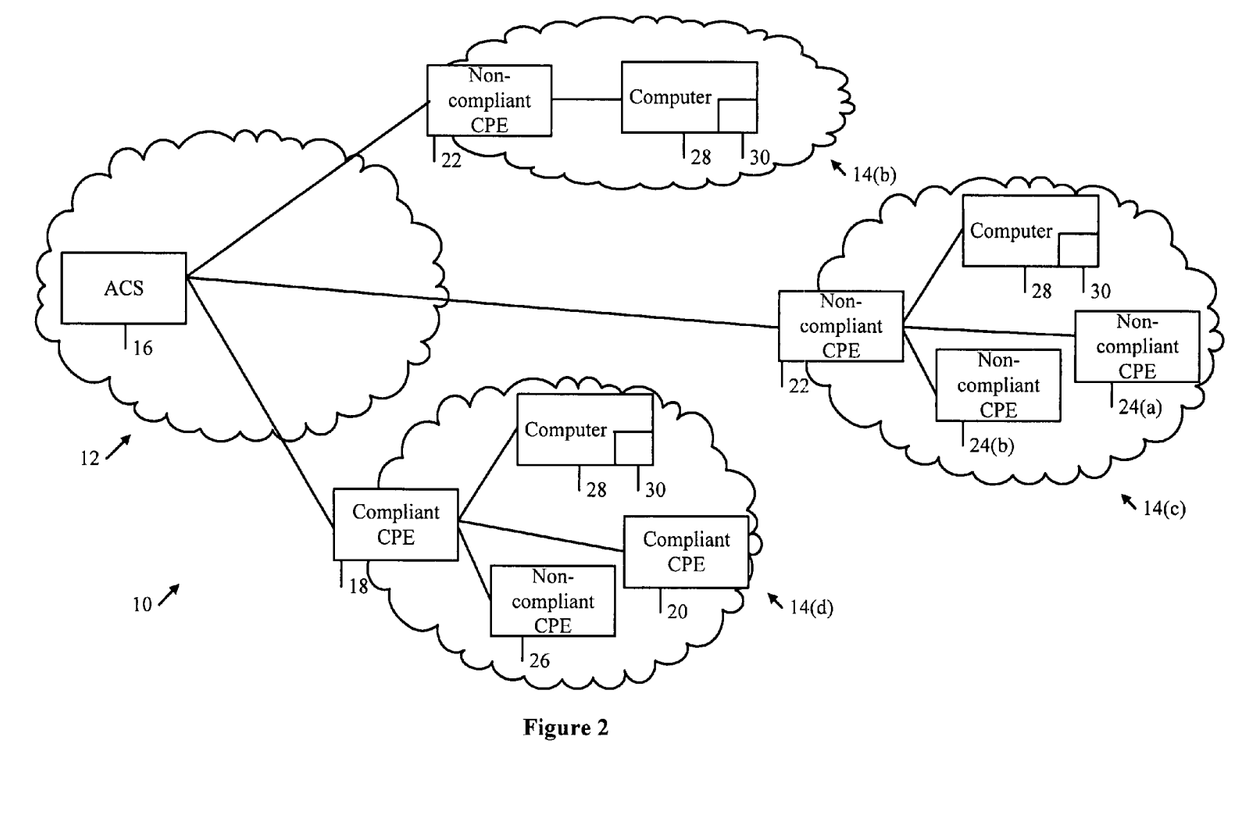
FIG. 2 illustrates an exemplary schematic diagram of a communication network having a management device that manages compliant and non-compliant equipment within the network.

FIG. 2 shows an exemplary schematic diagram of a communication network 10 having a WAN 12 comprising an ACS 16 and a few exemplary CPE 18, 20, 22, 24, 26 arrangements within the LANs 14. LAN 14(b) includes a non-compliant CPE 22 and a computer 28 having a proxy agent 30. LAN 14(c) includes a plurality of non-compliant CPEs 22, 24 and a computer 28 having a proxy agent 30. LAN 14(d) includes a non-compliant CPE 26, compliant CPEs 18, 20 and a computer 28 having a proxy agent 30. However, one skilled in the art will understand that other suitable CPE arrangements can be used in order to configure the non-compliant CPE 22, 24, 26 from the ACS 16.

The non-compliant CPE 22 is a broadband network termination device or IGD, such as a gateway, router or bridge which is not eligible to be configured by the ACS 16. The non-compliant CPE 24 is a device that receives and/or sends data over the WAN 12 such as a video STB or a VoIP ATA. In contrast, the non-compliant CPE 26, such as a print server, does not communicate over the WAN 12 but communicates within the LAN 14. Since the non-compliant CPE 26 does not communicate over the WAN 12, the non-compliant CPE 26 may not have an IP address. The non-compliant CPE 22, 24, 26 may be non-compliant because it does not support one or more of the requirements described above. For example, a bridge supports a data link layer or layer 2 of the OSI model but does not support the network layer or layer 3. Another example is that a VoIP ATA may not support SOAP and/or the RPCs. Yet another example is the print server may not support IP.

One possible solution to the above problem would be to make the non-compliant CPE 22, 24, 26 compliant by adding the missing component(s). However, this might be difficult. For example, the non-compliant CPE 22, 24, 26 may no longer be supported by the vendor, or the CPE 22, 24, 26 may not have the necessary resources, such as Random-Access Memory, Read-Only Memory, flash memory, and processing power to support adding the missing component(s). It may be less resource intensive, e.g. time or money, and easier for the vendor to produce a new compliant CPE 22, 24, 26 than to update the legacy CPEs 22, 24, 26 that are non-compliant. Furthermore, the non-compliant CPE 26 is not addressed by the TR-069 standards to become compliant. Consequently, there are millions of non-compliant CPEs 22, 24, 26 that will not become compliant.

Another solution, in accordance with the present invention, is to provide a proxy agent 30 that executes on a computer 28 within the LAN 14. The proxy agent 30 would appear to the ACS 16 as a compliant CPE 18, 20. The ACS 16 communicates with the proxy agent 30 using the CWMP. The CWMP provides management information which may be in the form of service information. The proxy agent 30 communicates with the non-compliant CPE 22, 24, 26 using a native protocol for the non-compliant CPE 22, 24, 26. For example, the native protocols used to communicate to the non-compliant CPE 22, 24, 26 may be LAN-Side DSL CPE Configuration (TR-064), HTTP, UPnP, SNMP, CLI over Telnet, and Layer Two Exchange Protocol (L2XP) which is a Siemens proprietary protocol. Thus, the operator may beneficially use the CWMP to remotely manage the non-compliant CPEs 22, 24, 26 via the proxy agent 30. As previously noted, a remote management system, such as the ACS 16, could not communicate to the non-compliant CPE 22, 24, 26 if the WAN side communication is disabled. However, since the proxy agent 30 resides within the LAN 14, the proxy agent 30 is able to communicate with the non-compliant CPE 22, 24, 26 when the WAN side communication is disabled. If the proxy agent 30 includes more than one native protocol, the proxy agent 30 may have to discover which of these protocols to use for the non-compliant CPE 22, 24, 26 which is discussed in more detail below. One skilled in the art will understand that other suitable protocols, such as AppleTalk, can be used in order communicate with the non-compliant CPE 22, 24, 26. In accordance to the present invention, a solution to manage the non-compliant CPE 22, 24, 26 in addition to managing a plurality of non-compliant CPEs 22, 24, 26 of different types is provided. Furthermore, the present invention provides a method to manage the computer 28, such as an email application, a web browser, and an operating system parameter, where the proxy agent 30 resides.

If the LAN 14 has both non-compliant 22, 24, 26 and compliant CPEs 18, 20, such as LAN 14(d), the proxy agent 30 communicates with the non-compliant CPE 22, 24, 26 to allow the remote management wherein the compliant CPE 18, 20 is managed directly, without using the proxy agent 30, from the ACS 16.

Figure 3A:
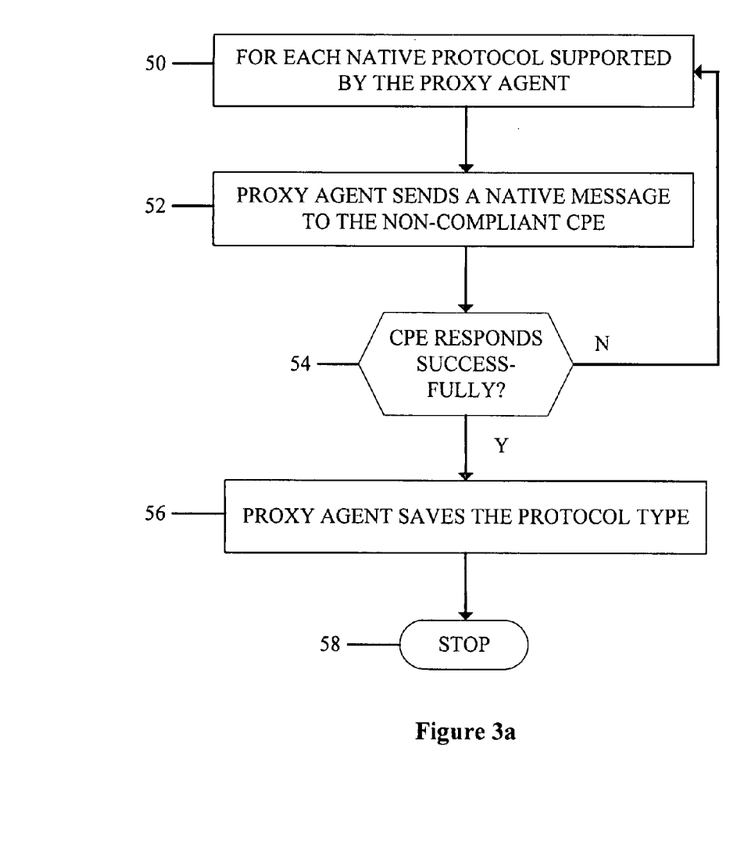
FIG. 3a illustrates an exemplary flow diagram for a discovery of a native protocol used by non-compliant equipment.
Figure 3B:
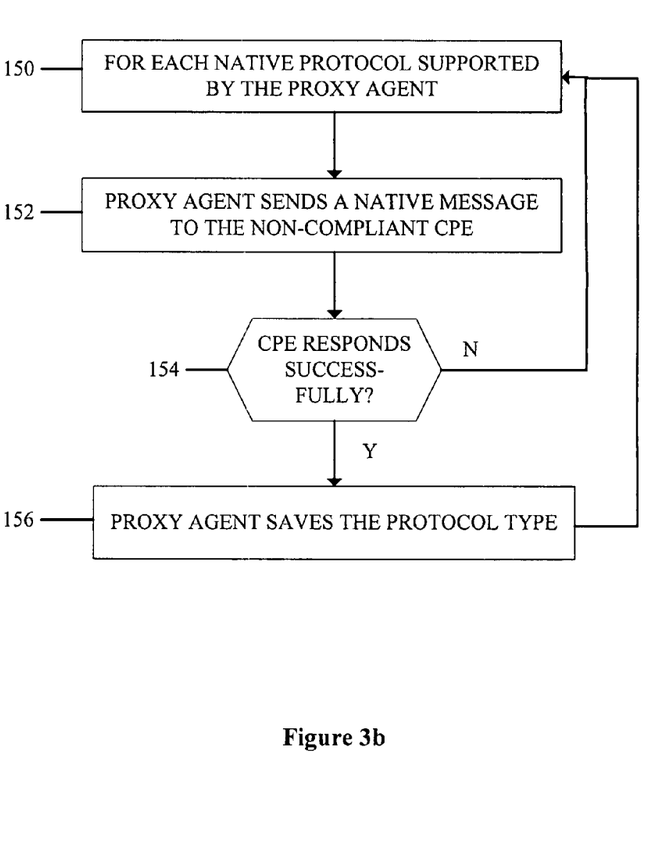
FIG. 3b illustrates an exemplary flow diagram for a discovery of a plurality of native protocols used by non-compliant equipment.

Referring now to FIGS. 2, 3a, and 3b, the proxy agent 30 may have to discover what native protocols are used by each non-compliant CPE 22, 24, 26 to be managed. According to one embodiment of the present invention, FIG. 3a, "for each native protocol supported by the proxy agent" 50, the "proxy agent sends a native message to the non-compliant CPE" 52. If the "CPE responds successfully" 54, the "proxy agent saves the protocol type" 56 and "stops" 58 the discovery process. Thus if the non-compliant CPE 22, 24, 26 supports multiple native protocols, only one will be discovered. The native messages may be sent in sequence, that is the proxy agent waits to send another message until it is determined if there is a successful response or no response. In contrast, a plurality of native messages may be sent substantially in parallel without waiting for a response.

For the following examples on how to discover a native protocol for the non-compliant CPE 22, assume the proxy agent 30 in LAN 14(b) supports UPnP and L2XP. In one example, an UPnP message could be sent to the non-compliant CPE 22. If the non-compliant CPE 22 responds then the proxy agent 30 saves that non-compliant CPE 22 uses UPnP. If however, the non-compliant CPE 22 does not respond, the proxy agent could send a L2XP message to the non-compliant CPE 22. Then if the non-compliant CPE 22 responds the proxy agent 30 saves that non-compliant CPE 22 uses L2XP. In another example, both an UPnP message and a L2XP message could be sent to non-compliant CPE 22. The proxy agent would save the protocol type of the first successful response received.

In another embodiment of the present invention, FIG. 3b, "for each native protocol supported by the proxy agent" 150, the "proxy agent sends a native message to the non-compliant CPE" 152. If the "CPE responds successfully" 154, the "proxy agent saves the protocol type" 156. Thus if the non-compliant CPE 22, 24, 26 supports multiple native protocols each native protocol supported by the proxy agent 30 is discovered. The native messages may be sent in sequence, that is the proxy agent waits to send another message until it is determined if there is a successful response. In contrast, a plurality of native messages may be sent substantially in parallel without waiting for a response.

For the following examples on how to discover a native protocol for the non-compliant CPE 22, assume the proxy agent 30 in LAN 14(b) supports UPnP and L2XP. In one example, an UPnP message could be sent to non-compliant CPE 22. If the non-compliant CPE 22 responds then the proxy agent 30 saves that non-compliant CPE 22 uses UPnP. After the successful response or a period a time, the proxy agent could send a L2XP message to the non-compliant CPE 22. Then if the non-compliant CPE 22 responds the proxy agent 30 saves that non-compliant CPE 22 uses L2XP. In another example, both an UPnP message and a L2XP message could be sent to non-compliant CPE 22. The proxy agent would save the protocol type of each successful response received.

In yet another embodiment of the present invention the proxy agent discovers if the saved native protocol or protocols support the converted CWMP commands valid for the non-compliant CPE 22, 24, 26. This may be useful if the non-compliant CPE 22, 24, 26 supports a plurality of protocols but each protocol does not support every converted CWMP command. Thus a mapping of the native protocols and the supported commands could be saved.

One skilled in the art will understand that there are other suitable methods of discovering the native protocol(s) supported by a non-compliant CPE 22, 24, 26 as well as other suitable methods of discovering if a command is supported by the native protocol.

Figure 4:
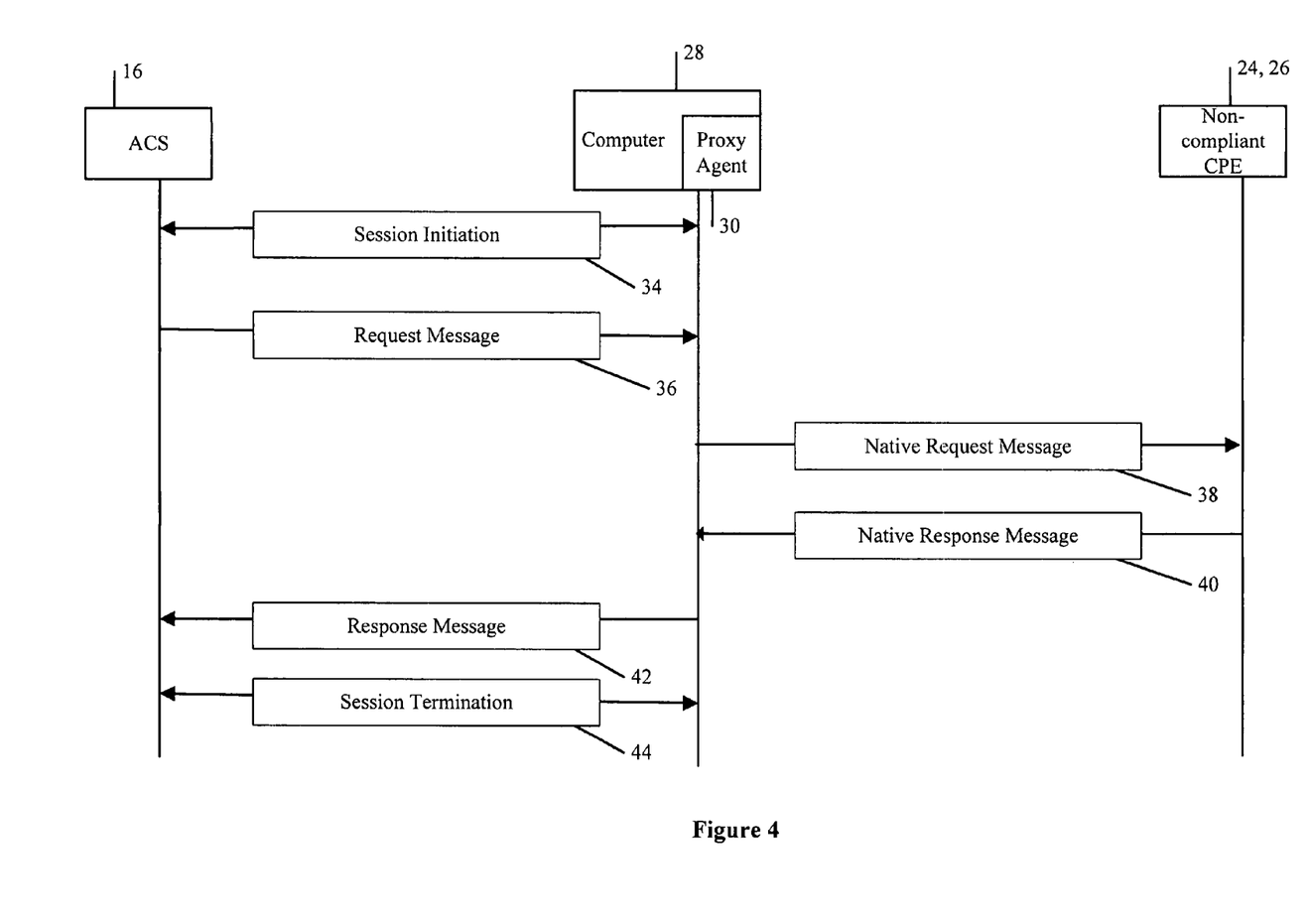
FIG. 4 illustrates an exemplary message flow to manage non-compliant equipment within the network.

Referring now to FIG. 4, an exemplary message flow to manage the noncompliant CPE 24, 26 in accordance to the present invention is provided. A CWMP session is initiated between the ACS 16 and the proxy agent 30 via a session initiation 34. Subsequently a request message 36 is sent to the proxy agent 30. The proxy agent 30 converts the request message 36 from CWMP to the native protocol suitable for the CPE 24, 26. The native request message 38 is then sent to the non-compliant CPE 24, 26. The non-compliant CPE 24, 26 processes the request message 38 and subsequently sends a native response message 40 to the proxy agent 30. The proxy agent 30 converts the response message 40 from the native protocol to a CWMP response message 42 that is sent to the ACS 16. The session between the ACS 16 and the proxy agent 30 is then terminated via a session termination 44.

Figure 5:
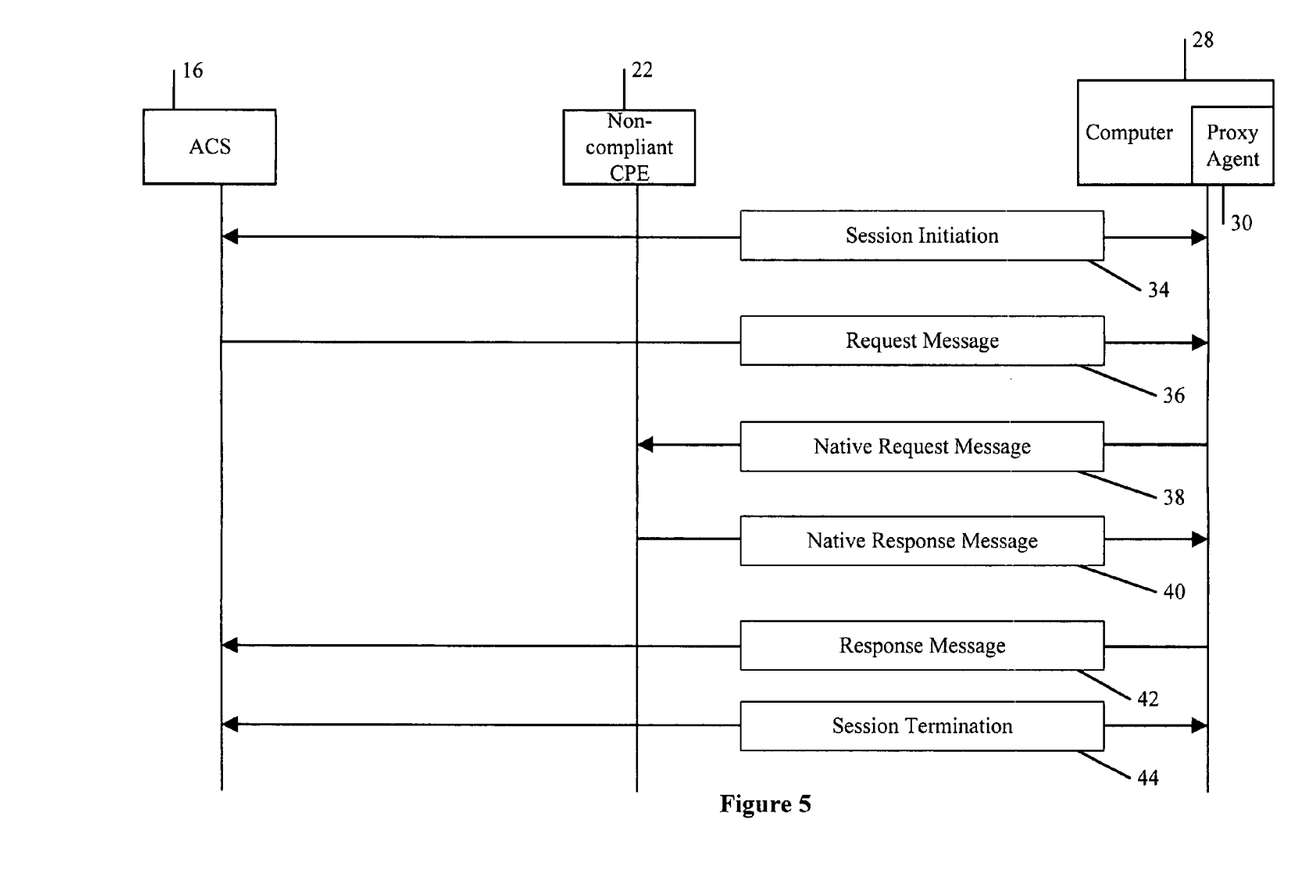
FIG. 5 illustrates another exemplary message flow to manage non-compliant equipment within the network.

Referring now to FIG. 5, an exemplary message flow to manage the noncompliant CPE 22 in accordance to the present invention is provided. A CWMP session is initiated between the ACS 16 and the proxy agent 30 via a session initiation 34. Subsequently a request message 36 is sent to the proxy agent 30. The proxy agent 30 converts the request message 36 from CWMP to the native protocol suitable for the CPE 22. The native request message 38 is then sent to the non-compliant CPE 22. The non-compliant CPE 22 processes the request message 38 and subsequently sends a native response message 40 to the proxy agent 30. The proxy agent 30 converts the response message 40 from the native protocol to a CWMP response message 42 that is sent to the ACS 16. The session between the ACS 16 and the proxy agent 30 is then terminated via a session termination 44.

When the ACS 16 manages the non-compliant CPE 22 the request message 36 passes through the CPE 22 as normal data traffic and is sent downstream from the CPE 22 to the proxy agent 30. The proxy agent 30 then sends the native request message 38 upstream to the non-complaint CPE 22. This is unlike when the ACS 16 manages a non-compliant CPE 24, 26 where the request does not pass through the CPE 24, 26 to be managed prior to reaching the proxy agent 30. This aspect of this example of the invention is important since the management of CPE 22 may disrupt service to the proxy agent 30. This in turn may prevent a complete management of the CPE 22 since the ACS 16 may not be able to communicate with the proxy agent 30 to in turn communicate with the CPE 22. Therefore, in the case of managing the CPE 22, special handling may be required, such as avoiding certain commands. For example, it may be desirable to avoid allowing alteration of a WAN routing table for the CPE 22.

Figure 6:
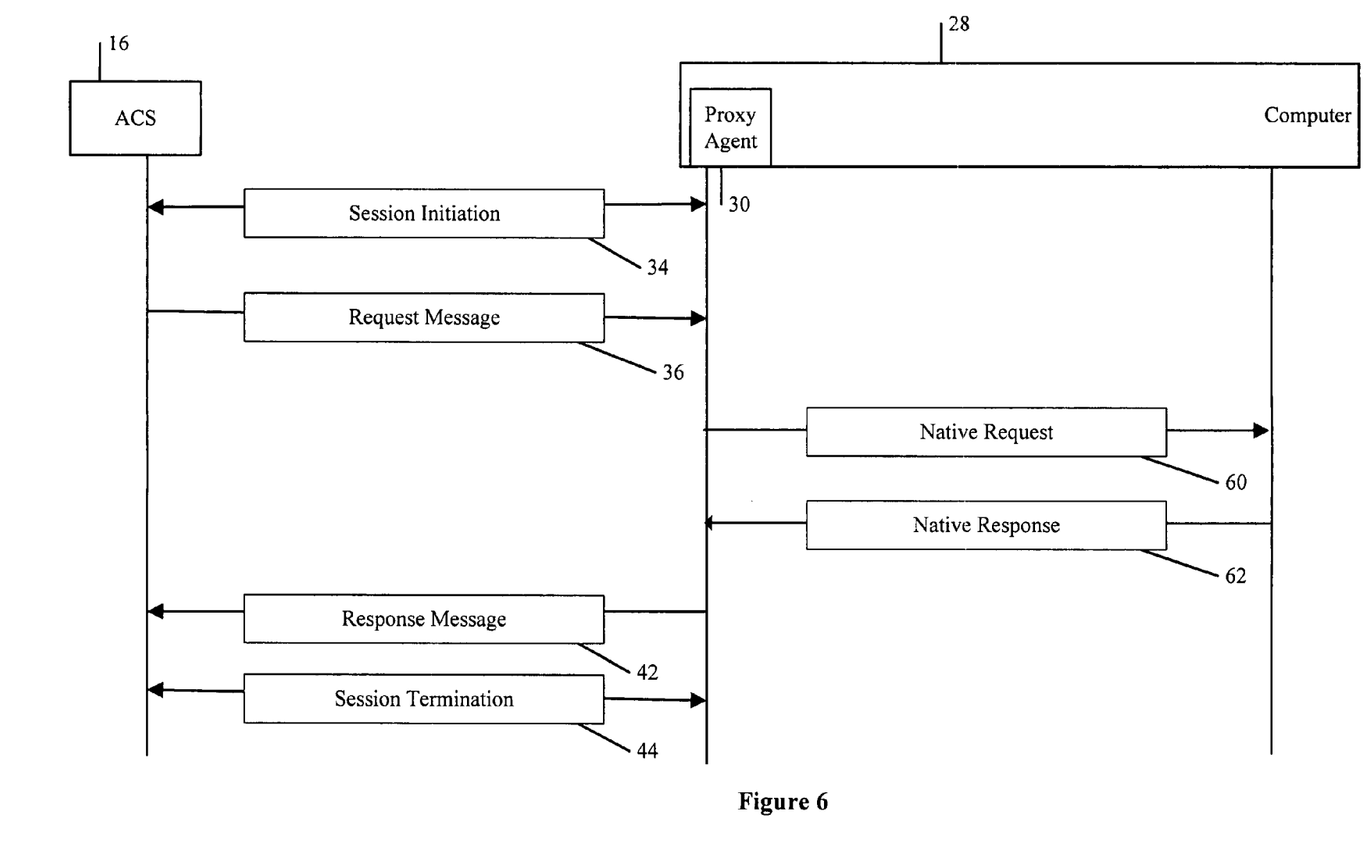
FIG. 6 illustrates, another exemplary message flow to a computer within the network.

Referring now to FIG. 6, an exemplary message flow to manage the computer 28 in accordance to the present invention is provided. A CWMP session is initiated between the ACS 16 and the proxy agent 30 via a session initiation 34. Subsequently a request message 36 is sent to the proxy agent 30. The proxy agent 30 converts the request 36 from CWMP to the native protocol suitable for the computer 28. The native request 60 is then sent to the computer 28. The native request 60 may be, for example, a message to the computer 28 or a system call. The computer processes the request 60 and subsequently sends a native response 62 to the proxy agent 30. The native response 62 may be, for example a message from the computer 28 or a system call status. The proxy agent 30 converts the response 62 from the native protocol to a CWMP response message 42 that is sent to the ACS 16. The session between the ACS 16 and the proxy agent 30 is then terminated via a session termination 44.

Since the proxy agent 30 resides on the computer 28 which is being managed, special handling may be required to avoid disruption of service to the computer 28. Otherwise, the proxy agent 30 may not be able to finish managing the computer. For example it may be desirable to avoid allowing or delay certain commands for the computer 28, such as a reboot command.

Referring now to FIGS. 4, 5 and 6 a single set of messages 34 is illustrated during a session initiation. However, multiple messages may be sent by the ACS 16 during a session initiation. Likewise, there may be multiple request messages 36, 38, response messages 40, 42 and/or session termination messages 44. For example, a single request message 36 from the ACS 16 may result in multiple native request messages 38 communicated toward the non-compliant CPE 22, 24, 26 as well as multiple response messages 40 from the non-compliant CPE 22, 24, 26. The term "toward" when used in context of communicating or sending "toward" a device means to send directly to such device or to send indirectly to such device via one or more intermediaries, and the like. Also, the exemplary illustration depicts the message flow to a single CPE 22, 24, 26 whereas a request message 36 may result in native request messages 38 to multiple CPEs 22, 24, 26. The native request messages 38 may have the same or different protocol depending on the native protocol for the CPEs 22, 24, 26 being configured.

Referring now to FIGS. 2, 4, 5 and 6 a plurality of non-compliant CPE(s) 22, 24, 26 may be managed from the ACS 16 via the proxy agent 30. In one embodiment, when the proxy agent 30 receives a request message 36, it converts the message 36 to a native protocol for each of the CPE(s) 22, 24, 26. For example, referring to the exemplary illustration of LAN 14(c), the message 36 may be converted to UPnP for non-compliant CPE 22, SNMP for non-compliant CPE 24(a) and XIO for non-compliant CPE 24(b).

In another embodiment, the proxy agent 30 analyzes the request message 36 to determine which non-compliant CPE 22, 24, 26 to send the native request message 38. For example, referring to the exemplary illustration of LAN 14(c), the proxy agent 30 could analyze the request message 36 to determine the type of device, such as a video device. If for example, CPE 22 is a gateway, CPE 24(a) is a video STB, CPE 24(b) is a VoIP ATA, the request message 36 is converted to a native protocol suitable for the CPE 24(a) since it is the only video type device. The native request message 38 is sent to the CPE 24(a). If a native protocol discovery and/or command discovery has been done, the proxy agent 30 may use the discovered information when converting the native protocol suitable for the CPE 24(a). If however, a native protocol discovery and/or command discovery has not been done, the proxy agent 30 may start a discovery process. Those skilled in the art would appreciate that a plurality of CPE arrangements 22, 24, 26 may be suitable to be managed by the request message 36. Such as if CPE 24(a) and CPE 24(b) are both video STB, the request message 36 is converted to a native protocol(s) suitable for each CPE 24(a), 24(b).

Figure 7:
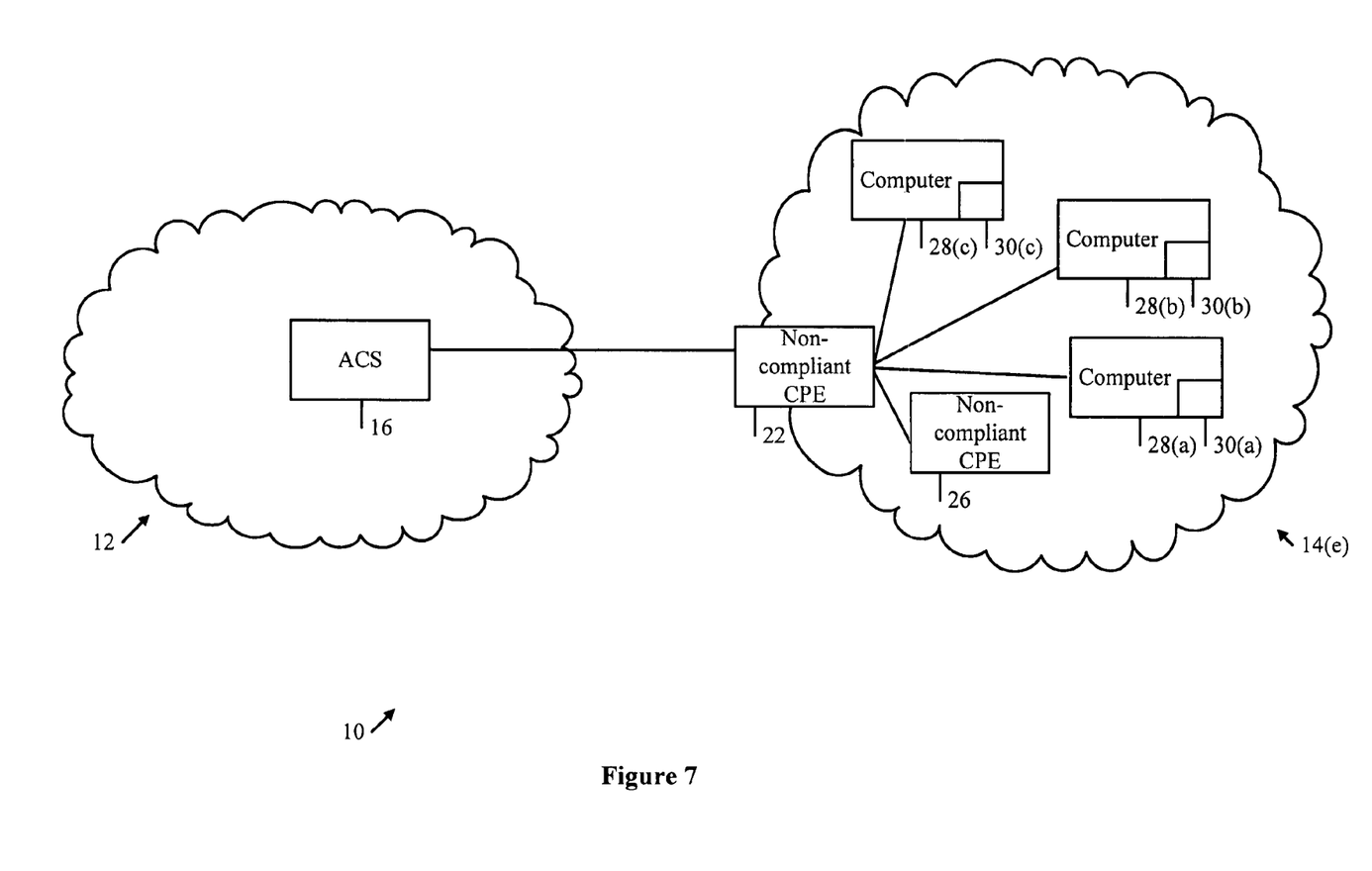
FIG. 7 illustrates an exemplary schematic diagram of a communication network having a management device that manages equipment within a LAN that has a plurality of proxy agents.

FIG. 7 illustrates an exemplary schematic diagram of a communication network having a management device that manages equipment within an exemplary LAN 14(e) that has a plurality of proxy agents 30 within a plurality of computers 28. When the LAN 14(e) has a plurality of proxy agents 30 it is desirable to have one of the proxy agents 30(a) as an active agent while the other proxy agents 30(b), 30(c) are on standby. Without an active-standby relationship, each of the proxy agents 30 issues discovery information to the ACS 16 for the same non-compliant CPE 22, 26, thereby confusing the ACS 16 as to which proxy agent 30 should be used to manage the non-compliant CPE. The discovery information to the ACS 16 may be part of the session initiation 34. In contrast, with the active-standby relationship, only the active proxy agent 30(a) issues the discovery information to the ACS 16 for the non-compliant CPE. Therefore, only the active proxy agent 30(a) receives the request message 36, and sends the native request message 38 to the appropriate non-compliant CPE 22, 26. One skilled in the art would also recognize that there may be other suitable arrangements of non-compliant CPEs 22, 24, 26. For example, a non-compliant CPE 24 may be included in the LAN 14. For another example, there may only be one non-compliant CPE 22, 24, 26 in the LAN 14. Additionally, each standby proxy agent 30(b), 30(c) may issue discovery information to the ACS 16 for the computer 28(b), 28(c) in which standby proxy agent 30(b), 30(c) resides.

When using an active-standby relationship, there should be a mechanism to control which proxy agent is the active and which is the standby. For example, if the computer 28(a) is powered down then there is no longer an active proxy agent. Thus, it is desirable that the standby proxy agents 30(b), 30(c) detect when there is no longer an active proxy agent 30(a). Furthermore, it may be desirable that the active proxy agent 30(a) is aware of the standby proxy agents 30(b), 30(c). For instance the standby proxy agent 30(b) may be powered on, in which case the active proxy agent 30(a) may inform proxy agent 30(b) that it should be in standby. Conversely, after the proxy agent 30(b) is powered on, it may inquire if there is an active proxy agent 30(a) to determine if it is a standby or active. As one skilled in the art would recognize, there are other ways to determine which proxy agent 30 is a standby or active. Additionally, other suitable methods to control the plurality of proxy agents 30 may be used. For example, a master-slave relationship may be used. In one embodiment of a master-slave relationship, the master proxy agent might be used to manage the computer 28 wherein the slave proxy agent resides.

Figure 8:
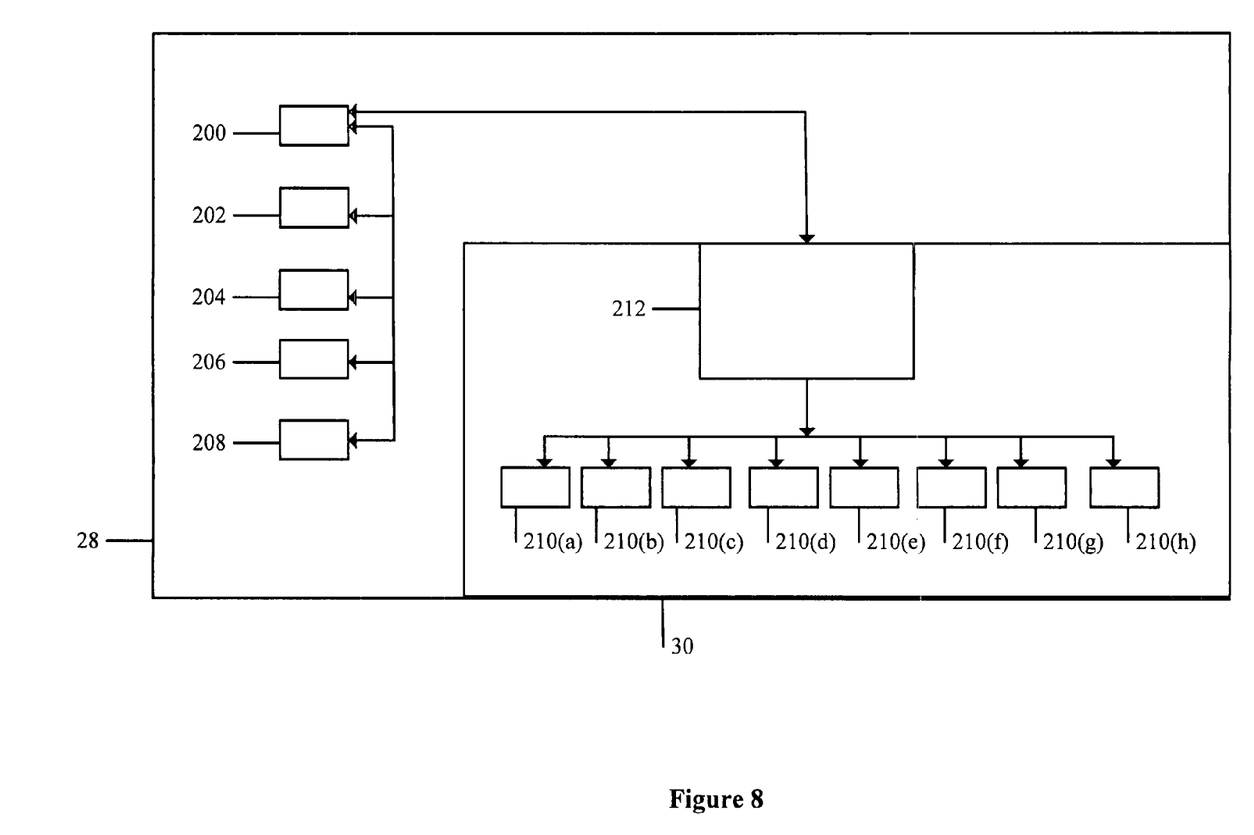
FIG. 8 illustrates an exemplary schematic diagram of a proxy agent residing on a computer.

FIG. 8 illustrates an exemplary schematic diagram of a computer 28 having a proxy agent 30. The computer 28 includes a processor 200, and memory 202, such as, RAM, ROM, flash memory, that is operatively connected to the computer 28. The computer 28 may also include services, parameters and applications such as, an operating system 204, a WEB browser 206, and an email application 208, which are operatively connected to the computer 28. The proxy agent 30, which may be operatively connected to the processor 200, for example via an operating system such as Windows or MAC OS. The proxy agent 30 may include protocol interfaces such as HTTP 210(a), SOAP 210(b), Simple Traversal of User Datagram Protocol (UDP) Through Network Address Translators (NATs) per TR-111, STUN 210(c), UPnP 210(d), SNMP 210(e), LAN-Side DSL CPE Configuration TR-064 210(f), Telnet 210(g), and L2XP 210(h). The protocol interfaces 210 may be used in the discovery and conversion processes 212, such as the discovery of the native protocols used by a non-compliant CPE 22, 24, 26, discovery of which native supported commands may be used and converting between CWMP to the native protocol as described above. One skilled in the art would also recognize there may be other suitable configurations for the proxy agent 30. For example, the proxy agent 30 may include an interface to SSL or not have an interface to L2XP 210(h).

One skilled in the art will appreciate that certain adaptations or changes may be made to the TR-069 and/or TR-106 protocols in order to optimize or implement certain aspects of the present invention. For example, changes may be needed to manage the computer 28 or CPE 26. Another example is that the reboot command could be modified to specify which device to reboot since the proxy agent 30 may be managing a plurality of non-compliant CPEs 22, 24, 26. This might be achieved by specifying an Organizational Unique Identifier (OUI) and/or a serial number of the non-compliant CPE 22, 24, 26 to reboot.

While the preferred embodiments of the present invention have been shown and described herein, it will be obvious that such embodiments are provided by way of example only. Numerous variations, changes and substitutions will occur to those of skill in the art without departing from the invention herein. Also, one or more aspects or features of one or more embodiments or examples of the present invention may be used or combined with one or more other embodiments or examples of the present invention. Accordingly, it is intended that the invention be limited only by the spirit and scope of the appended claims.

The invention claimed is:

1. A method for remotely managing a non-compliant Customer Premises Equipment (CPE) residing at an edge of a Local Area Network (LAN), comprising the steps of:
providing a proxy agent that resides on an entity in the LAN, which proxy agent is receiving from a Wide Area Network (WAN) configuration device a CPE WAN Management Protocol (CWMP) request message, which request message passes through the non-compliant CPE;
converting the request message to a first protocol that is used by the non-compliant CPE;
communicating the converted request message upstream toward the non-compliant CPE;
receiving a response from the non-compliant CPE;
converting the response from the first protocol to the CWMP;
sending the converted response upstream toward the WAN configuration device,
wherein the non-compliant CPE is non-compliant in accordance with the CWMP, and
managing the non-compliant CPE from the WAN configuration device.

2. The method of claim 1, wherein said proxy agent providing step comprises providing a proxy agent which resides on a computer in the LAN.

3. The method according to claim 1, wherein the proxy agent avoids allowing the request message.

4. The method according to claim 3, wherein the avoided message is a command to alter a WAN routing table in the non-compliant CPE.

5. The method according to claim 1, further comprising using a non-compliant CPE which is a layer 2 device without an interface for Internet Protocol (IP).

6. The method according to claim 1, further comprising:
discovering the first protocol prior to converting the request message; and
saving the discovered protocol.

7. The method according to claim 6, further comprising:
discovering a second protocol supported by the non-compliant CPE prior to converting the request message; and
saving the discovered protocol.

8. The method according to claim 7, further comprising:
discovering a supported command by the first protocol; and
discovering a supported command by the second protocol.

9. The method according to claim 8, wherein converting the request message includes using the discovered protocol and command support to determine which protocol handles the command.

10. The method according to claim 6, further comprising selecting the first protocol from the group consisting of: Simple Network Management Protocol (SNMP), Terminal emulation program (Telnet), Universal Plug and Play (UPnP), Hypertext Transfer Protocol (HTTP), L2XP, and LAN-Side DSL CPE Configuration TR-064.

11. The method according to claim 1, wherein the entity in the LAN is a computer and further comprising remotely managing the computer via the proxy agent.

12. The method according to claim 1, wherein the proxy agent comprises a Hyper Text Transfer Protocol (HTTP) client, an HTTP server, Simple Remote Procedure Call (RPC) methods and a Simple Object Access Protocol (SOAP).

13. The method according to claim 12, wherein the proxy agent providing step further comprises providing a Simple Traversal of User Datagram Protocol (UDP) Through Network Address Translators (NATs) per TR-111 (STUN).

14. The method of claim 1, wherein the non-compliant CPE residing at the edge of the LAN is an Internet Gateway Device (IGD) of the LAN.

* * * * *